Jan. 18, 1949.  T. R. THOMAS  2,459,201
JUNCTION SEAL APPARATUS
Filed March 22, 1946
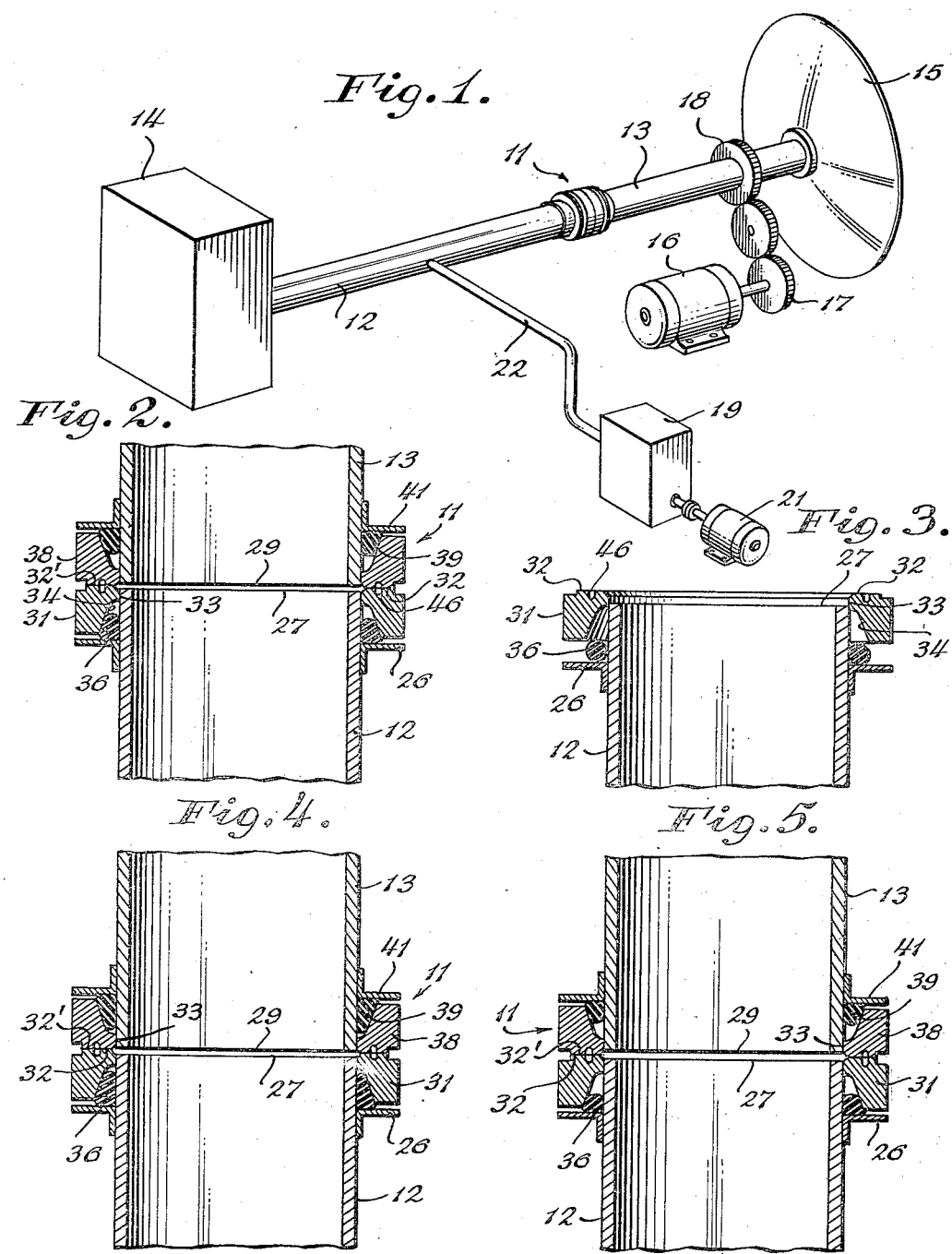
INVENTOR
THOMAS R. THOMAS
BY Herbert H. Thompson
ATTORNEY Patented Jan. 18, 1949

2,459,201

UNITED STATES PATENT OFFICE 2,459,201

JUNCTION SEAL APPARATUS

Thomas R. Thomas, Baldwin, N. Y., assignor to The Sperry Corporation, a corporation of Delaware Application March 22, 1946, Serial No. 656,375

13 Claims. (Cl. 285—196)

The present invention relates to junction seal apparatus, and particularly to apparatus permitting relative rotation between two members while obstructing fluid transfer through the junction. It is especially useful in connection with pressurized radio energy transfer systems involving relative rotation between two sections of high frequency energy conduit such as hollow tube wave guides.

In radio systems for operation in aircraft, and especially in high power ultra high frequency transmitting systems for aircraft, it is highly desirable that a dry atmosphere at high pressure be maintained within the radio apparatus. This is accomplished in fixed apparatus without great difficulty, but a problem arises where relative movement is required between parts of the radio system. In an aircraft radar system, for example, regular rapid movement of the directive antenna is required for derivation of directional information. To permit such antenna movement while maintaining efficient energy transfer between the antenna and associated apparatus, a hollow high frequency energy conductor comprising a fixed section and a rotating section has been provided as an energy transfer conduit, the former section being connected to the fixedly mounted radio apparatus in the craft, and the latter section being connected to the antenna. Although attempts have been made to provide rotation-permitting junction seal devices for preventing the escape of compressed gas, the prior devices have proven unsuccessful. Even when the performance of the prior devices was acceptable at moderate temperatures, failures resulted from tests at the extremes of the great temperature range experienced in operation of aircraft up to very high altitudes.

The present invention has as its object the provision of improved junction seal apparatus.

It is an object of the present invention to provide improved junction apparatus for permitting relative movement such as relative rotation between two high frequency energy conductor sections while providing an efficient barrier to the passage of fluid such as gas through the junction apparatus between the interior of the high frequency energy conductor and the external space.

It is a further object to provide compact, light weight junction apparatus for permitting relative rotation between two conductor sections and preventing fluid leakage throughout an extremely wide temperature range.

In the prior seal devices, rigid friction-contact surfaces were provided externally of wave guide tubes, and were so arranged along with the tubes as to form a cavity therebetween entirely filled with an elastic material such as rubber. Because of the large temperature coefficient of expansion of those elastic materials which remain flexible and elastic at extremely low temperatures, the elastic material underwent such shrinkage at very low temperatures as to cause an opening of the seal device. An attempt to overcome this trouble by compression of a greater quantity of the elastic material into the cavity produced intolerable pressures on the friction surfaces due to the tendency of the elastic material to expand greatly at high temperature.

In the present invention, these difficulties have been overcome by the provision of a rigid friction ring at the end of one of the high frequency energy conductor tubes arranged to abut a cooperating ring or flange at the adjacent end of the other conductor tube. A specially designed flexible resilient connection is provided between the rigid ring and the tube, of such design as to be given adequate room for expansion at high temperatures, and so arranged that it does not exert excessive force upon the rigid ring when it is expanded. By virtue of the special design of the present invention, the contraction of the resilient material resulting from use at extremely low temperature does not result in separation of the normally closed surfaces of the junction apparatus, and hence the joint remain pressure-tight at extremely low temperatures.

In accordance with a further feature of the present invention, the cooperating surfaces of the ring and the abutting member associated with the opposite wave guide tube are made precisely conformal as by forming mating optically flat surfaces on the frictionally cooperating parts; and in accordance with still a further feature of the invention, a groove may be provided within one of the conformal surfaces and filled with a supply of viscous fluid such as dense oil or grease. This serves as a supplementary barrier to prevent the seepage of gas between the conformal surfaces of the ring and the cooperating part.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

The above objects and features of the present invention are illustrated and further objects and features will become apparent in the following detailed description, taken in connection with the drawings, wherein:

Fig. 1 is a perspective view of a radio system including an energy conduit incorporating the present invention;

Fig. 2 is a cross-sectional view showing details of a preferred embodiment of the present invention; and Figs. 3, 4 and 5 illustrate the manner in which the present invention adapts itself to different operating conditions.

In Fig. 1 there is shown a rotation-permitting seal 11 incorporated at the junction between a stationary tubular conduit section such as a wave guide 12 and a rotatable tubular conduit section such as a wave guide 13. Section 12 may be connected to radio apparatus 14 such as a transmitter or a receiver or a radar transmitter-receiver combination, and the rotatable conduit section 13 may support at its end a directive antenna system 15. A motor 16 may be provided with a gear 17 meshing with a gear 18 upon the rotatable wave guide 13, for regularly rotating antenna 15 and wave guide 13 at a predetermined speed.

In order to guard against damage due to rarefaction of the air, as particularly where the ultra high frequency radio system is to be employed aboard aircraft operating at very high altitudes, a motor driven compressor system including a compressor pump 19 and a motor 21 may be connected to the stationary conduit section or tube 12 by a connecting hose 22. Where such pressurizing apparatus is employed, it is necessary that precautions be taken to guard against excessive leakage of gas through the junction apparatus 11. Accordingly, this apparatus 11 takes the form illustrated in the cross-sectional view of Fig. 2. The stationary tube 12 is provided with a flange 26 near its end 27. A first ring 31 formed with a clearance bore 33 surrounds the end of the first wave guide 12. The ring 31 may be made of a very hard metal, e. g., of a stainless steel characterized by a Brinell hardness of 700. A portion of the bore through ring 31 is conically tapered as at 34 with a relatively shallow cone angle, and an annular elastic member 36 is compressed within the confines which include the outer surface of tube 12, the upper surface of flange 26 and the conically tapered portion 34 of the bore in ring 31. The elastic member 36 may be made of a synthetic rubber, e. g., of a plastic having a Vinylite base.

The ring 31 is provided with a "riding" surface 32, which may be optically flat in a plane substantially perpendicular to the axes of ring 31 and tube 12. A recess may be formed in the ring 31 parallel to the axis thereof, and a cooperating key pin therefor may be provided in the flange 26, if desired, to ensure against relative rotation between the ring and the associated flange.

There is provided at the adjacent end of tube 13 a surface 32' which is essentially sealed to the tube 13 and arranged to be accurately conformal with the riding surface 32 of ring 31. For some applications, this surface could be rigidly fixed to tube 13, being integral therewith or being a surface of a flange rigidly fixed upon tube 13. In a preferred embodiment of the invention, however, a second ring 38 similar to the first ring 31 may be provided with a second resilient member 39 and a second flange 41 near the end 29 of tube 13. By making the conformal surfaces 32 and 32' of rings 31 and 38 optically flat, as by grinding and lapping, rings 31 and 38 may be made as exact duplicates, for simplicity in manufacture. The elastic members 36 and 39 preferably are formed with circular torus cross-sections, and are so dimensioned that each of these toroidal elastic members 36 and 39 is in compressional contact with the outer surface of the associated wave guide tube, the surface of the flange and the conical surface of the ring.

It has been found advantageous to make the conically tapered surfaces of the rings according to cone angles of the order of 40°. That is, the tapered inner wall of each ring makes an angle of the order of 20° with the axis thereof. With such conically tapered bores of the rings presented to the annular elastic members, the rings 31 and 38 are retained in satisfactorily tight conformal contact at extremely low temperatures, such as temperatures lower than −20° F., and the annular elastic members 36 and 39 prevent seepage of gas between the tubes and their respective rings.

In Fig. 3 is shown a ring 31 and an annular elastic member 36 in place upon the tube 12, the elastic member 36 being shown in its normal size corresponding to a temperature of 65° F., and being substantially circular in cross-sectional form, the ring 31 having not yet been pressed axially into its operating position. Upon bringing the other conduit section or tube 13 with its associated seal apparatus parts into its operating positional relation with conduit section 13, ring 31 is moved downwardly, to the position as shown in Fig. 2, the annular elastic member 36 being compressed into a shape characterized by a somewhat distorted cross-sectional configuration thereof, as seen in Fig. 2. By virtue of the configuration of the inner surface of ring 38, e. g., with a cone angle of the order of 40°, the elastic member 39 may be extensively deformed without exerting excessive axial force on ring 38, and hence without causing excessive frictional power loss at the conformal surfaces of ring 38 and ring 31.

Fig. 4 shows the apparatus 11 with the elastic members greatly expanded, as due to an extremely high temperature, e. g., +150° F. At such a temperature, the maximum for which experience has indicated that allowance need be made, adequate space still is provided for the expansion of the elastic members, but as will be noted, both members 36 and 39 are greatly distorted. Because of the relative configurations of the rings and the elastic members, the increased distortion of the elastic members accompanying operation at the highest temperatures does not result in excessive axial forces exerted upon the rings.

Fig. 5 shows the manner in which the annular elastic member 93 tends to return to a circular cross-section, but with a smaller torus cross-sectional diameter, as it contracts with decreasing temperature. It has been found that even with extensive contraction of the elastic members 36 and 39 due to extremely low temperatures, e. g., a temperature as low as −50° F., the elastic members exert adequate axial force on the rings 31 and 38 urging them into satisfactory cooperating relation despite the appreciable change in cross-sectional form of the elastic members.

As has been pointed out above, the abutting surfaces 32 and 33 of the rings 31 and 38 must be made accurately conformal, and the required conformability may be readily achieved by grinding and lapping these surfaces to a condition of optical flatness; i. e., to such precision that the surfaces are found satisfactorily flat by optical tests involving the principles of Newton's diffraction rings. With such accurate conformability of the surfaces, the seepage of gas between the surfaces is effectively suppressed. However, in accordance with a feature of the present invention, as annular groove 46 may be provided in a ring 31 within the conformal surface thereof, and if desired, duplicate annular grooves may be provided in the rings, as illustrated in Fig. 2. The space thus provided may be filled with a viscous fluid such as a heavy oil or grease, to serve as an augmenting barrier to the seepage of gas through the seal, and to serve as a lubricant thereof.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a joint for maintaining two wave guide tubes in pressure-tight relation and in proper electrical relation while permitting relative rotation of the tubes, for operation under a wide range of atmospheric conditions, in combination, a pair of rings having cooperating pressure-sealing faces, at least one ring being mounted adjacent the end of one tube in a manner to permit relative axial movement between the ring and tube while restraining relative rotation therebetween, an abutment on said tube adjacent said ring, an annular resilient member located between said abutment and said ring, means for holding the tubes in fixed axial relation to each other, and means for maintaining said member under an initial compression whereby to squeeze said rings together, the initial compression being sufficiently great that the member is retained in compressed condition even when subject to shrinkage by reason of extreme atmospheric conditions.

2. The apparatus defined in claim 1, wherein said ring presents a conical face in contact with said annular resilient member.

3. Apparatus for maintaining a pressure-tight seal between two tubes while permitting relative rotation therebetween, comprising means on the first one of said tubes presenting a first transverse planar contact surface, a ring surrounding the second of said tubes and presenting a transverse planar contact surface for engaging said first transverse contact surface, said ring being conically tapered in a surface opposite said transverse planar contact surfaces, an annular resilient member presenting a toroidal outer surface in contact with said conically tapered surface of said ring, and means on said second tube defining a recess for retaining said resilient member compressed against said ring whereby said ring is maintained pressed into contact with said first transverse planar contact surface and is sealed to said second tube.

4. Apparatus as defined in claim 3, wherein annular grooves are formed in said transverse planar contact surfaces for retaining viscous fluid in pressure seal maintaining relation with said surfaces.

5. Apparatus for maintaining a pressure-tight seal between two tubes while permitting relative rotation therebetween, comprising a first rigid ring surrounding the first of said tubes adjacent the end thereof, a second rigid ring surrounding the second of said tubes adjacent the end thereof, each of said first and second rings having an optically flat face transverse its axis, said flat faces being in abutting contact, and means sealing said first ring to said first tube and said second ring to said second tube and retaining said flat faces in said abutting contact.

6. Apparatus as defined in claim 5, wherein a circular groove is provided in the flat face of at least one of said rigid rings, and a viscous fluid is provided in said groove for ensuring against the leakage of gas between said faces.

7. Apparatus as defined in claim 5 wherein said first and second rigid rings are duplicates.

8. Apparatus as defined in claim 5, wherein said first and second rigid rings are duplicates, and said sealing and retaining means comprises annular elastic bodies of toroidal form compressed between said rings and the respective tubes.

9. Apparatus for maintaining a pressure-tight seal between adjacent ends of two axially aligned tubes while permitting relative rotation therebetween, comprising a first rigid ring substantially coaxially surrounding a first one of said tubes adjacent the end thereof, a second rigid ring substantially coaxially surrounding the second of said tubes adjacent the end thereof, said first and second rings having mutually conformal abutting faces substantially coaxial with said tubes, said first ring having a bore therethrough providing clearance over the outer surface of said first tube, said bore being conically tapered through at least part of the axial extent of said first ring, and annular elastic means compressed between the outer surface of said first tube and the conically tapered bore surface of said first ring and sealing said first ring to said first tube and urging said first ring toward said second ring for maintaining the mutually conformal abutting faces of said rings compressed together.

10. Apparatus as defined in claim 9, said second ring having a bore therethrough providing clearance over the outer surface of said second tube, said bore being conically tapered through at least part of the axial extent of said second ring, and said apparatus further including annular elastic means compressed between the outer surface of said second tube and the conically tapered bore surface of said second ring and sealing said second ring to said second tube and urging said second ring toward said first ring.

11. Apparatus as defined in claim 9, wherein the conically tapered bore surface is characterized by a cone angle of substantially forty degrees.

12. Apparatus as defined in claim 9, wherein the conically tapered bore surface of said first ring is characterized by a cone angle of substantially forty degrees, and said first tube is provided with a radially extensive flange abutting said annular elastic means opposite said first ring.

13. Apparatus as defined in claim 9, wherein an annular groove is provided within at least one of said mutually conformal abutting faces, and a viscous fluid is provided in said groove as a barrier against the passage of less viscous fluid between said conformal abutting faces.

THOMAS R. THOMAS.

REFERENCES CITED

The following references are of record in the file of this patent:

UNITED STATES PATENTS

| Number | Name | Date |
|---|---|---|
| Re. 22,353 | Karlberg | July 27, 1943 |
| 1,531,563 | McDowell | Mar. 31, 1925 |
| 1,774,179 | MacGregor | Aug. 26, 1930 |
| 2,114,771 | Turner et al. | Apr. 19, 1938 |
| 2,246,600 | Putnam et al. | June 24, 1941 |

FOREIGN PATENTS

| Number | Country | Date |
|---|---|---|
| 313,574 | Italy | Dec. 29, 1933 |